United States Patent Office 2,998,441
Patented Aug. 29, 1961

2,998,441
ORGANOTIN MERCAPTO COMPOUNDS
Gerry P. Mack, Jackson Heights, and Emery Parker, New York, N.Y., assignors, by mesne assignments, to Carlisle Chemical Works, Inc., Reading, Ohio, a corporation of Ohio
No Drawing. Original application Jan. 2, 1953, Ser. No. 329,481, now Patent No. 2,914,506, dated Nov. 24, 1959. Divided and this application July 3, 1959, Ser. No. 824,788
1 Claim. (Cl. 260—429.7)

The invention relates to novel organotin mercapto compounds, and this application is a division of our copending application Serial No. 329,481, filed Jan. 2, 1953, for "Halogen-Containing Resins Stabilized With Organo-Tin Mercapto Compounds," now Patent No. 2,914,506.

The new organotin mercapto compounds have the formula

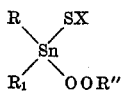

wherein R and R' are monovalent hydrocarbon radicals, OOR" is a carboxylic acid radical selected from the group consisting of monocarboxylic acid radicals and polycarboxylic acid radicals having not more than three carboxyl groups of which all but one are blocked by esterification, and where SX is the radical of a mercapto compound selected from the group consisting of aliphatic mercaptans having 8 to 18 C atoms, aromatic mercaptans, monohydric and polyhydric thioalcohols and thioalcoholesters, thioacids and thioacidesters, said radical being linked to the Sn atom through the S atom of the mercapto group.

R and R' may be different monovalent hydrocarbon radicals but will be generally the same radicals because the starting materials for the preparation of the organotin mercapto compounds will be generally the di-(or tri-) hydrocarbon tin halides or oxides available in commerce. The nature of these groups has in most cases no, or only a very minor, influence on the properties of the end products. R and R' may be aliphatic, aromatic, or alicyclic groups, such as methyl, ethyl, propyl, butyl, amyl, hexyl, octyl, lauryl, allyl, benzyl, phenyl, tolyl, cyclohexyl.

SX may be, for instance, the rest of a mercaptan, of a mercapto alcohol, or of an ester of a mercapto alcohol or mercapto acid.

Aliphatic and aromatic mercaptans may be employed to form said group SX. In the case of aliphatic mercaptans, we prefer mercaptans having 8 to 18 C atoms, e.g. decyl or dodecyl mercaptan, because the lower mercaptans are unsuitable for the preparation and use of the stabilizers on account of their offensive smell.

Suitable aromatic mercaptans are, for instance, thionaphthol, thiobenzyl alcohol, phenoxyethyl mercaptan, phenoxyethoxyethyl mercaptan, and others.

As examples for suitable mercapto alcohols, we may recite mono thioethylene glycol, mono thiopropylene glycol, thioglycerol, thio diethylene glycol, and others. Particularly suitable are the esters of these mercapto alcohols in which the hydroxyl groups are esterified by an aliphatic, aromatic, or alicyclic saturated or unsaturated mono carboxylic acid. An example of such an ester is e.g. thioglycol 2-ethyl hexoic acid ester.

Readily available mercapto acid esters are the esters of thioglycolic acid, such as ethyl thioglycolate, and generally the esters of mono and dibasic aliphatic and aromatic mercapto acids, such as esters of beta thiopropionic acid, thiolactic acid, thiobutyric acid, alpha mercapto lauric acid, thiomalic acid, thiosalicylic acid, and the like.

The compounds are prepared by reacting one mole of a diorganotin oxide or alkoxide with one mole of the recited mercapto compounds and one mole of the recited morocarboxylic or polycarboxylic acids. If a diorganotin halide is used as starting material, preferably mercapto compounds are used in which the hydrogen of the SH group is replaced by sodium, as well as the sodium salts of the carboxylic acids.

The compounds are of particular value as stabilizers for halogen-containing resins because they do not produce the so-called "cross-staining" when resins stabilized therewith are brought in contact with resins or rubbers containing metal compounds, like lead or cadmium, forming colored sulfides.

The following examples will serve to illustrate the invention:

Example 1

A mixture of 0.1 mol of lauryl mercaptan, 0.1 mol of lauric acid and 0.1 mol of dibutyl tin oxide were heated under vacuum until the water formed in the reaction was completely eliminated. The obtained product corresponded essentially to the formula

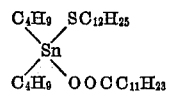

and contained 18.8% of tin and 5.0% of sulfur; it had a specific gravity of 1.036, and a refr. index of 1.4834 at 20° C.

Example 2

73.8 g. of mono oleyl maleate as prepared by heating equimolar amounts of maleic anhydride and oleyl alcohol, 40.4 g. of lauryl mercaptan and 50 g. of dibutyl tin oxide were heated together under stirring at 100–110° C. until the water of reaction was eliminated; the last traces of water were removed by heating the reaction product under reduced pressure. The reaction product contained 15.0% of tin and 4.0% of sulfur and had a specific gravity at 20° C. of 1.038 and a refractive index at 20° C. of 1.4890. It corresponded essentially to the dibutyl tin lauryl mercaptide oleyl maleate of the formula

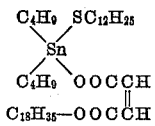

We claim:
Organo-tin mercapto compounds of the formula

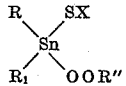

wherein R and R' are monovalent hydrocarbon radicals, OOR" is a carboxylic acid radical selected from the group consisting of monocarboxylic acid radicals and polycarboxylic acid radicals having not more than three carboxyl groups of which all but one are blocked by esterification, and where SX is the radical of a mercapto compound selected from the group consisting of aliphatic mercaptans having 8 to 18 C atoms, aromatic mercaptans, monohydric and polyhydric thioalcohols and thioalcoholesters, thioacids and thioacidesters, said radical being linked to the Sn atom through the S atom of the mercapto group.

References Cited in the file of this patent

UNITED STATES PATENTS

| | | |
|---|---|---|
| 2,480,823 | Morris et al. | Sept. 6, 1949 |
| 2,560,034 | Eberly | July 10, 1951 |
| 2,726,227 | Leistner et al. | Dec. 6, 1955 |
| 2,801,258 | Johnson | July 30, 1957 |
| 2,855,417 | Weinberg | Oct. 7, 1958 |